United States Patent
Mizuuchi et al.

(10) Patent No.: US 6,353,495 B1
(45) Date of Patent: Mar. 5, 2002

(54) METHOD FOR FORMING A FERROELECTRIC DOMAIN-INVERTED STRUCTURE

(75) Inventors: Kiminori Mizuuchi, Neyagawa; Kazuhisa Yamamoto, Takatsuki; Tatsuo Kawaguchi, Motosu-Gun; Minoru Imaeda, Nagoya, all of (JP)

(73) Assignees: Matsushita Electric Industrial Co., Ltd., Osaka; NGK Insulators, Ltd., Nagoya, both of (JP)

( * ) Notice: Subject to any disclaimer, the term of this patent is extended or adjusted under 35 U.S.C. 154(b) by 0 days.

(21) Appl. No.: 09/375,082

(22) Filed: Aug. 16, 1999

(30) Foreign Application Priority Data

Aug. 18, 1998 (JP) .......................................... 10-231770

(51) Int. Cl.[7] .......................... G02F 1/355; G02F 1/365
(52) U.S. Cl. ........................ 359/326; 359/332; 385/122
(58) Field of Search ............................... 359/326–332; 385/122

(56) References Cited

U.S. PATENT DOCUMENTS

| 5,249,250 A | * | 9/1993 | Yamada et al. ............. 385/122 |
| 5,424,867 A | * | 6/1995 | Nihei et al. .................. 359/326 |
| 5,652,674 A | * | 7/1997 | Mizuuchi et al. ........... 359/326 |
| 5,758,263 A | * | 5/1998 | Gupta et al. ............. 359/328 X |
| 5,854,870 A | * | 12/1998 | Helmfrid et al. ............ 385/122 |
| 6,002,515 A | * | 12/1999 | Mizuuchi et al. ........... 359/326 |

FOREIGN PATENT DOCUMENTS

| EP | 0 699 934 A2 | 3/1996 |
| JP | 05 224265 | 9/1993 |

OTHER PUBLICATIONS

Mizuuchi, K. et al. "Harmonic blue light generation in X–cut MgO:LiNbO$_3$ waveguide" *Electronics Letters* vol. 33, No. 9, pp. 806–807, Apr. 24, 1997.

* cited by examiner

*Primary Examiner*—John D. Lee
(74) *Attorney, Agent, or Firm*—Burr & Brown

(57) ABSTRACT

A method for forming a ferroelectric domain-inverted structure, having the steps of joining at least two kinds of ferroelectric material which have different spontaneous polarizations, and ferroelectric domain-inverting one of the ferroelectric materials and thereby ferroelectric domain-inverting the other ferroelectric material joined thereto.

56 Claims, 9 Drawing Sheets

Z direction

METHOD FOR FORMING A FERROELECTRIC DOMAIN-INVERTED STRUCTURE

BACKGROUND OF THE INVENTION

1. Field of the Invention

This invention relates to a method for forming a ferroelectric domain-inverted structure, more particularly a method for forming a ferroelectric domain-inverted structure which is preferably usable for forming a periodic ferroelectric domain-inverted structure in an optical waveguide device suitable for a second harmonic-generation (SHG) device utilizing a Quasi-Phase-Matching (QPM) system.

2. Related Art Statement

As a light source for a blue laser usable for an optical pickup, etc., it is desirable to employ a SHG device utilizing a QPM system, comprising an optical waveguide made of lithium niobate single crystal or lithium tantalate single crystal which has a periodic ferroelectric domain-inverted structure. The device may be widely used in the fields of optical disk memory, medicine, and optochemistry, and can also be used as an optical pickup for various optical measurement devices.

The periodic ferroelectric domain-inverted structure may be formed on a ferroelectric single crystal such as lithium niobate by a titanium indiffusion method, a lithium oxide out-diffusion method, a silicon dioxide cladding and heat treatment method, a proton-exchanging and heat treatment method, an electron beam-scanning method, an electric voltage applying method, or the like. Because it is capable of forming a uniform and deep ferroelectric domain-inverted layer, the electric voltage applying method is most effectively used.

Moreover, the technique of ferroelectric domain-inverting a ferroelectric single substrate such as lithium niobate by the electric voltage applying method is effective in the case of forming a periodic ferroelectric domain-inverted structure for a QPM-SHG device.

For example, in "Journal of Lightwave Technology", Vol.14, No.3, March, 1996, p462~468, the condition for ferroelectric domain-inverting a substrate made of lithium niobate single crystal by the electric voltage applying method is described in detail. Furthermore, in "Electronics Lett.", Vol.32, No.22, Oct. 24, 1996, p2091~2092, an example of domain-inverting a substrate made of MgO doped lithium niobate single crystal by the electric voltage applying method is described. In "Appl. Phys. Lett.", 70(10), March, 1997, p1201~1203, an example of ferroelectric domain-inverting a substrate made of lithium tantalate single crystal is explained.

However, a substrate made of a bulk single crystal except the above lithium niobate, MgO doped lithium niobate single crystal and lithium tantalate single crystal has hardly been investigated.

The inventors have investigated a method that, as shown in FIG. 1, a film 2 made of ferroelectric single crystal is formed on an X-cut face of a substrate 1 made of ferroelectric single crystal by a liquid-phase epitaxial method and a comb-shaped electrode 3 and a uniform electrode 4 are formed on the ferroelectric single crystalline film 2, and thereafter the film 2 is polarized in the Z-direction.

However, when the same condition of applying an electric voltage as that in the above conventional techniques is employed in the above method as shown in FIG. 1, the film cannot be ferroelectric domain-inverted.

SUMMARY OF THE INVENTION

It is an object of the present invention to provide a method for easily forming ferroelectric domain-inverted structures, containing finely inverted domains, in a material that is otherwise resistant to the formation of such structures.

It is another object of the present invention to provide an easy method for ferroelectric domain-inverting, by the electric voltage applying method, a ferroelectric single crystal whose ferroelectric domain-inverting conditions are not necessarily clear.

It is still another object of the present invention to provide a method for changing a ferroelectric domain-inverted area when a ferroelectric domain-inverted structure is formed by the electric voltage applying method.

This invention relates to a method for forming a ferroelectric domain-inverted structure, comprising the steps of:

joining at least two kinds of ferroelectric material which have different spontaneous polarizations, and ferroelectric domain-inverting one ferroelectric material among the ferroelectric materials and thereby ferroelectric domain-inverting the other ferroelectric material joined thereto.

A ferroelectric domain-inverted structure in a ferroelectric memory or a SHG device is required to have finely inversed domains with a dimension of sub-microns to several microns. Forming a ferroelectric domain-inverted structure having finely inverted domains is difficult because of the following two reasons:

1. Forming fine ferroelectric domain-inverted nuclei is sometimes difficult depending on the material, and
2. Finely ferroelectric domain-inverted structures tend to collapse as ferroelectric domain-inverted parts grow from the ferroelectric domain-inverted nuclei.

The ferroelectric domain-inversion starts when the ferroelectric domain-inverted nuclei generate and the ferroelectric domain-inverted structure is formed. When the characteristics of the applied electric voltage and the ferroelectric domain-inversion are investigated in detail, the applied electric voltage is more slightly increased to an inversion-voltage at the beginning of the ferroelectric domain-inverted nuclei's generation.

Depending upon the material, however, the ferroelectric domain-inverted nuclei are very unlikely to generate, or the ferroelectric domain-inversion occurs in a whole range without the generation of the ferroelectric domain-inverted nuclei. For example, since the generating voltage of the ferroelectric domain-inverted nuclei is very different from the inversion-voltage in a material that is resistant to generation of the ferroelectric domain-inverted nuclei, the ferroelectric domain-inversion is rapidly progressed just after the generation of the ferroelectric domain-inverted nuclei. Thus, it is very difficult to control the configuration of the ferroelectric domain-inverted parts.

On the other hand, in a material without the generation of the ferroelectric domain-inverted nuclei, voltage-applied parts thereof are easily inverted. In this case, the ferroelectric domain-inversion occurs in the whole of the parts around an electrode, so that the ferroelectric domain-inversion's configuration can not be controlled by a fine electrode structure.

The present invention is based on the discovery of the above fact.

BRIEF DESCRIPTION OF THE DRAWINGS

For a better understanding of this invention, reference is made to the attached drawings, wherein.

DETAILED DESCRIPTION OF THE INVENTION

This invention is described in detail hereinafter, with reference to the attached drawings.

Figure 2:
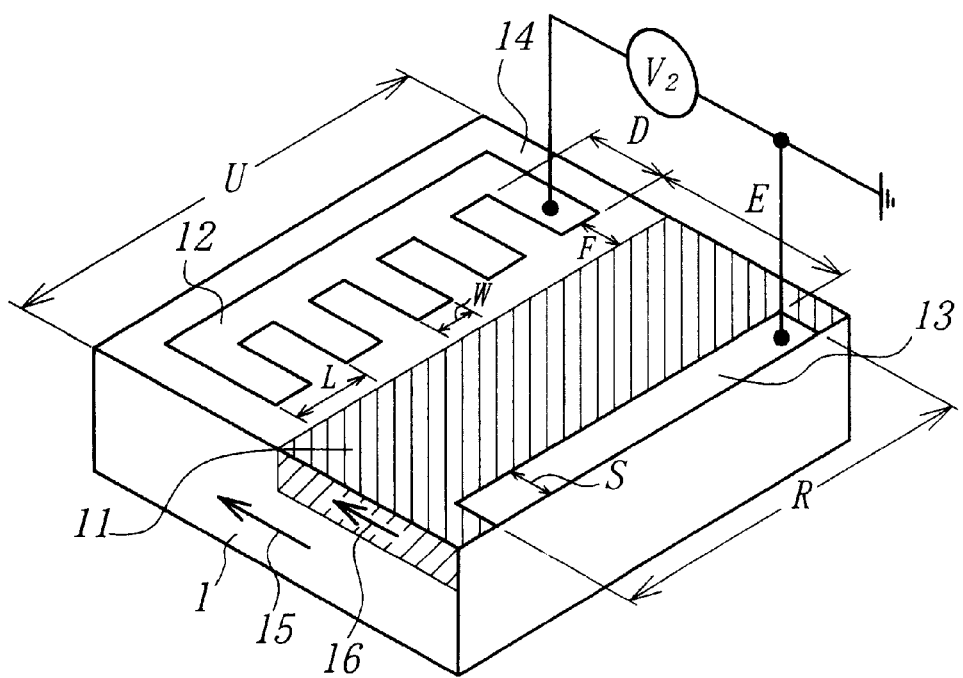
FIG. 2 is a view for explaining an example of a method for forming a ferroelectric domain-inverted structure of the present invention.

FIG. 2 is a view for explaining an example of a method for forming a ferroelectric domain-inverted structure according to the present invention.

In FIG. 2, a ferroelectric single crystalline film 11 typically resistant to the generation of the ferroelectric domain-inversion nuclei, is formed by a liquid phase epitaxial method on a ferroelectric single crystalline substrate 1 made of a material such as lithium niobate or tantalum niobate, which easily generates ferroelectric domain-inverted nuclei. A comb-shaped electrode 12, to start ferroelectric domain-inversion, is formed on a main surface of the ferroelectric single crystalline substrate 1 and a uniform electrode 13 is formed on the ferroelectric single crystalline film 11. Hereupon, the comb-shaped electrode 12 and the uniform electrode 13 compose a pair of electrodes. When an electric voltage is applied between the pair of electrodes, a fine ferroelectric domain-inverted structure is formed on the main surface 14 of the ferroelectric single crystalline substrate 1. The ferroelectric domain-inverted structure grows and reaches the boundary face between the substrate 1 and the film 11. This phenomenon acts as a trigger and the ferroelectric domain-inversion progresses beyond the boundary face, so that a periodic ferroelectric domain-inverted structure is formed in the ferroelectric single crystalline film 11.

Figure 3:
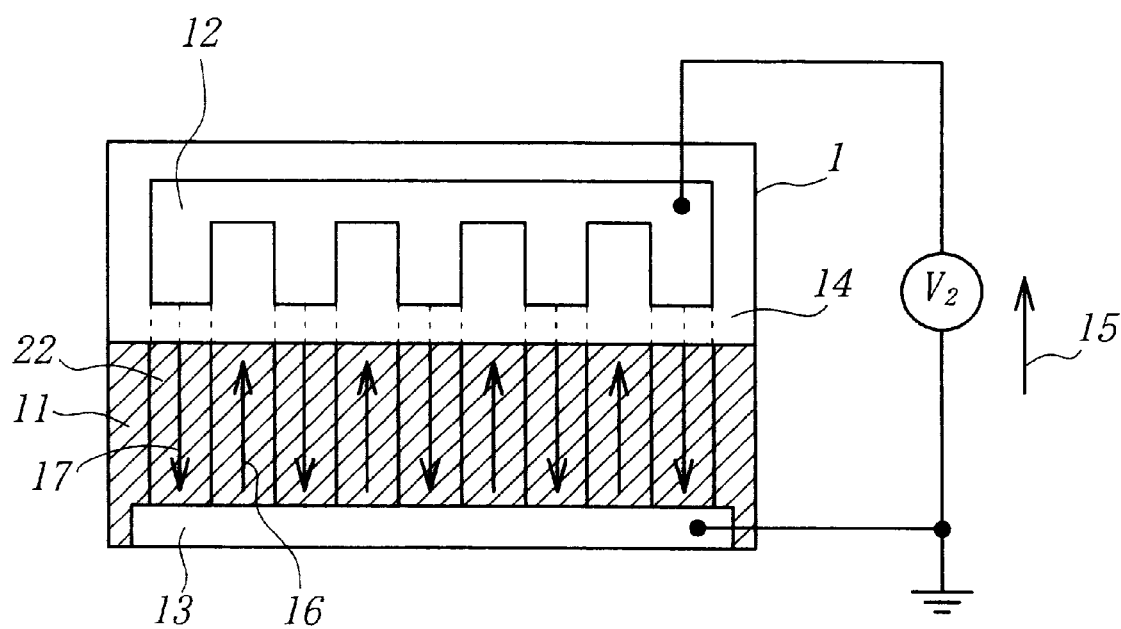
FIG. 3 is a view for explaining a polarization-condition by utilizing a method for forming a ferroelectric domain-inverted structure of the present invention.

That is, as shown in FIG. 3, a polarization 17, depending on the period of the comb-shaped electrode 12, is formed beyond the boundary between the ferroelectric single crystalline substrate 1 and the ferroelectric single crystalline film 11, and a ferroelectric domain-inverted structure is formed, having a fine inversed period and configuration depending upon the period of the comb-shaped electrode 12.

Moreover, in the case of forming a ferroelectric domain-inverted structure in a bulk single crystal such as $LiNbO_3$, $LiTaO_3$ as in the conventional method, it is difficult to form the ferroelectric domain-inverted structure as the ferroelectric domain-inversion parts become fine. The reason is that the ferroelectric domain-inversion progresses in a horizontal direction during the generating process of the ferroelectric domain-inverted nuclei and the growing process of the ferroelectric domain-inverted parts in a polarization-direction of the substrate. Normally, if a shortest length of the surface area of each of the ferroelectric domain-inversion parts is not more than 2 $\mu$m, it is very difficult to form the ferroelectric domain-inverted structure. Employing a Z-cut face's substrate, it is difficult to form the ferroelectric domain-inverted structure on the substrate having a thickness of not less than 0.2 mm. Moreover, if the shortest length is not more than 1 $\mu$m, a thickness of the substrate is required to be not more than 0.15 mm and the ferroelectric domain-inverted part's area is required to be reduced.

On the contrary, if ferroelectric materials having different spontaneous polarizations are joined and the ferroelectric domain-inverted structure is formed, according to the present invention, the lateral progression of the ferroelectric domain-inversion is suppressed and thereby the ferroelectric domain-inverted structure can be formed uniformly.

For example, if a second ferroelectric material is joined to a first ferroelectric material, and the second ferroelectric material has twice as large a spontaneous polarization as the first ferroelectric material, and if ferroelectric domain-inverted parts are formed toward the second ferroelectric material from the first ferroelectric material, the ferroelectric domain-inverted parts in the second ferroelectric material have only half of the area of that in the first ferroelectric material. That is, the ferroelectric domain-inverted parts having different areas can be formed in those materials, respectively.

According to the present invention, ferroelectric domain-inverted parts having the shortest lengths of the surface configuration of not more than 1 $\mu$m can be easily formed.

The reason why the ferroelectric domain-inverted structures having different inversion-periods and different inversed configurations can be formed is considered as follows.

In the case that a ferroelectric single crystal having a spontaneous polarization of Ps is ferroelectric domain-inverted, a current in the inversed area having a cross section S is indicated as 2Ps·S. Thus, one joined ferroelectric single crystal is ferroelectric domain-inverted and a current of 2Ps·S flows in the other joined ferroelectric single crystal. Since the current is constant, the cross section S' of the inversed area in the other ferroelectric single crystal changes depending on its spontaneous polarization Ps'.

That is, since the current passing the boundary between the joined ferroelectric single crystals is constant, the cross section S' of the inverted area is smaller than the cross section S if the spontaneous polarization Ps' is larger than the spontaneous polarization Ps and the cross section S' is larger than the cross section S if the polarization Ps' is smaller than the polarization Ps.

In FIG. 2, since the voltage-application conditions for ferroelectric domain-inverting the ferroelectric single crystalline substrate 1 are known and the ferroelectric domain-inversion characteristics or conditions of the ferroelectric single crystalline film 11 are not known, the comb-shaped electrode 12 for ferroelectric domain-inverting of the pair of electrodes is formed on the main surface of the substrate 1. Then, the film 11 is ferroelectric domain-inverted by ferroelectric domain-inverting the substrate 1 beyond the boundary between the substrate 1 and the film 11.

According to the present invention, by joining a ferroelectric single crystal having unknown inversion-characteristics or conditions to a ferroelectric single crystal having known inversion-characteristics or conditions and starting ferroelectric domain-inversion from the known ferroelectric single crystal, ferroelectric domain-inversion generated in the known ferroelectric single crystal is formed continuously in the other ferroelectric single crystal joined beyond the boundary between those ferroelectric single crystals. That is, a ferroelectric domain-inverted structure-forming method of the present invention can be applied to any ferroelectric single crystals having unknown spontaneous polarization.

In the above explanation, single crystalline materials are used as different ferroelectric materials, but materials made of polycrystal, microcrystal, amorphous, or materials made of a combination of single crystal and the former polycrystal, etc. may be used, which leads to easy formation of the ferroelectric domain-inversion.

For example, an amorphous ferroelectric film is formed on a ferroelectric single crystalline substrate and, by inverting polarization from the ferroelectric single crystal, ferroelectric domain-inverted parts are transcription-formed in the amorphous ferroelectric film.

The use of diffusion-bonding enables an easier joint between different crystals. Thus, it is helpful in joining the different crystals. Normally, the conditions of lattice constant's matching, etc. are required to grow a different crystal on a crystal and it is difficult to grow a crystal not satisfying the above conditions.

As a ferroelectric material usable for this invention, lithium niobate ($LiNbO_3$), lithium tantalate ($LiTaO_3$), potassium lithium tantalate ($K_3Li_2Nb_5O_{15}$), lithium niobate-lithium tantalate ($LiNb_{1-x}Ta_xO_3$ ($0 \leq x \leq 1$)) or the like may be used. Moreover, those materials are preferably single crystals because, for example, a QPM-SHG device which is formed of the above material has large conversion efficiency.

In this invention, at least two kinds of the above ferroelectric materials having different spontaneous polarizations are joined. Then, since the ferroelectric domain-inverted structure which is formed by the method according to the present invention is mainly utilized for an optical waveguide element such as a second harmonic-generation device, the above joint is carried out by forming a film of ferroelectric material on a substrate of ferroelectric material through the liquid phase epitaxial method or by diffusion-bonding a ferroelectric material to a substrate of a ferroelectric material.

Diffusion-bonding enables different crystals to be joined at the atomic order. Thus, it makes easy a transcription of ferroelectric domain-inversion between the crystals. Moreover, since diffusion bonding has a large degree of freedom in the crystals to be joined to each other, it enables many kinds of crystals to be joined to each other. That is, it enables a fine ferroelectric domain-inverted structure to be formed in many kinds of ferroelectric materials.

FIG. 2 shows, as an example of the ferroelectric domain-inverted structure of this invention, an embodiment in which the ferroelectric single crystalline film 11 is formed on the ferroelectric single crystalline substrate 1 by the liquid phase epitaxial method and the joint according to the present invention is carried out.

As above mentioned, when the ferroelectric domain-inverted structure as shown in FIG. 2 is adopted, as shown in FIG. 3, the ferroelectric domain-inversion progresses beyond the boundary between the ferroelectric single crystalline substrate 1 and the ferroelectric single crystalline film 11 and the ferroelectric domain-inverted structure of the substrate 1 is transcribed to the film 11.

The ferroelectric single crystalline substrate 1 made of the above ferroelectric material may be selected from the group consisting of magnesium (Mg), zinc (Zn), scandium (Sc), indium (In) for enhancing optical damage resistance of the substrate.

Moreover, the substrate 1 may contain, as an element for generating a laser, at least one from a lanthanide series such as neodymium (Nd), erbium (Er), thulium (Tm), holmium (Ho), dysprosium (Dy), and praseodymium (Pr).

Furthermore, the substrate may contain titanium (Ti) for increasing a refractive index thereof.

From the viewpoint that the conditions of ferroelectric domain-inversion are known, the ferroelectric single crystalline substrate 1 is preferably composed of lithium niobate-lithium tantalate solid solution or the same one containing Mg.

A main surface of the ferroelectric single crystalline substrate 1 may be composed of every kind of face of the above ferroelectric material such as an X-cut face, a Y-cut face, a Z-cut face, or an off-cut face. For forming a clear ferroelectric domain-inverted structure, however, a cut face having a polarization axis alongside an opposed direction of the electrodes is preferably employed.

Moreover, if an off-cut face having an X-axis tilted to a normal of a substrate (having a Z-axis tilted to a parallel of a substrate) is employed, the ferroelectric domain-inverted parts are formed in the interior of the substrate alongside the Z-axis. Consequently, a deep ferroelectric domain-inverted structure can be formed.

As the ferroelectric single crystalline film 11, the above ferroelectric single crystalline material may be used.

For enhancing the optical damage resistance of the ferroelectric single crystalline film 11 and increasing the refractive index thereof, the film 11 may contain the same element as in the ferroelectric single crystalline substrate 1. Moreover, as an element for generating a laser, the film 11 may contain the same element, such as Nd, as in the substrate 1.

Among those materials, lithium niobate-lithium tantalate single crystal, or the same one containing at least one of Zn, Ti, Mg, Er, Nd, and Sc may be preferably used, on account of its large non-linear optical constant.

The ferroelectric single crystalline film 11 is formed of the ferroelectric single crystalline material on the ferroelectric single crystalline substrate 1 by the liquid phase epitaxial method.

A polarization-orientation 15 in the ferroelectric single crystalline substrate 1 is transcribed to the ferroelectric single crystalline film 11, so that a polarization part 16 is formed in the film 11.

As shown in FIG. 2, if the layered ferroelectric single crystalline film 11 is formed and the thus obtained assembly is used for an optical waveguide element, the thickness of the film is preferably 1 μm to 30 μm.

Next, the comb-shaped electrode 12 and the uniform electrode 13 are formed on a main surface 14 of the ferroelectric single crystalline substrate 1 and on the ferroelectric single crystalline film 11 by photolithography or the like, respectively.

The pitch L of the comb-shaped electrode 12 is preferably 1.5 µm to 5 µm, from a view of being capable of generating a laser in a range of an ultraviolet region to a blue region. The width W of each convex portion in the comb-shaped electrode 12 is preferably formed so that the duty ratio of its width may be not more than 1/2, because a fine ferroelectric domain-inverted structure having a duty ratio of 50% can be formed.

It is required that the comb-shaped electrode 12 is opposite to the uniform electrode 13. The distance E of the uniform electrode 13 from the top of each convex portion in the comb-shaped electrode 12 is preferably 100 µm to 1 mm. The distance F of the boundary between the film 11 and the electrode 12 from the top of each convex portion in the comb-shaped electrode 12 is preferably 1 µm to 200 µm.

The comb-shaped electrode 12 and the uniform electrode 13 may be formed of a material such as Ta, Al, Au, Pt, Cr or Cu.

When a given electric voltage $V_2$ is supplied between the comb-shaped electrode 12 and the uniform electrode 13, ferroelectric domain-inverted parts 22 (see FIG. 3) having opposite polarizations 17 to polarizations 15 in the substrate are formed in the ferroelectric single crystalline film 11 depending on the pitch of the comb-shaped electrode 12.

The value and the build-up time of the electric voltage $V_2$ to supply between the comb-shaped electrode 12 and the uniform electrode 13 are, depending on the spontaneous polarization of the ferroelectric single crystalline material composing the substrate, preferably 1 kV/mm to 1000 kV/mm and 0.01 msec to 20 msec, respectively.

In the case of employing, as the ferroelectric single crystalline film 11, lithium niobate-lithium tantalate single crystal having clear ferroelectric domain-inversion characteristics or conditions, the build-up time is preferably 0.01 msec to 10 msec.

Moreover, in the case of employing, as the ferroelectric single crystalline film 11, lithium niobate-lithium tantalate single crystal and of forming the comb-shaped electrode 12 to start the ferroelectric domain-inversion on the ferroelectric single crystalline film 11, exchanging the electrode 12 for the uniform electrode 13, the electric voltage's build-up time of not more than 0.01 msec enables the ferroelectric domain-inverted structure to be formed in the ferroelectric single crystalline film 11.

Figure 4:
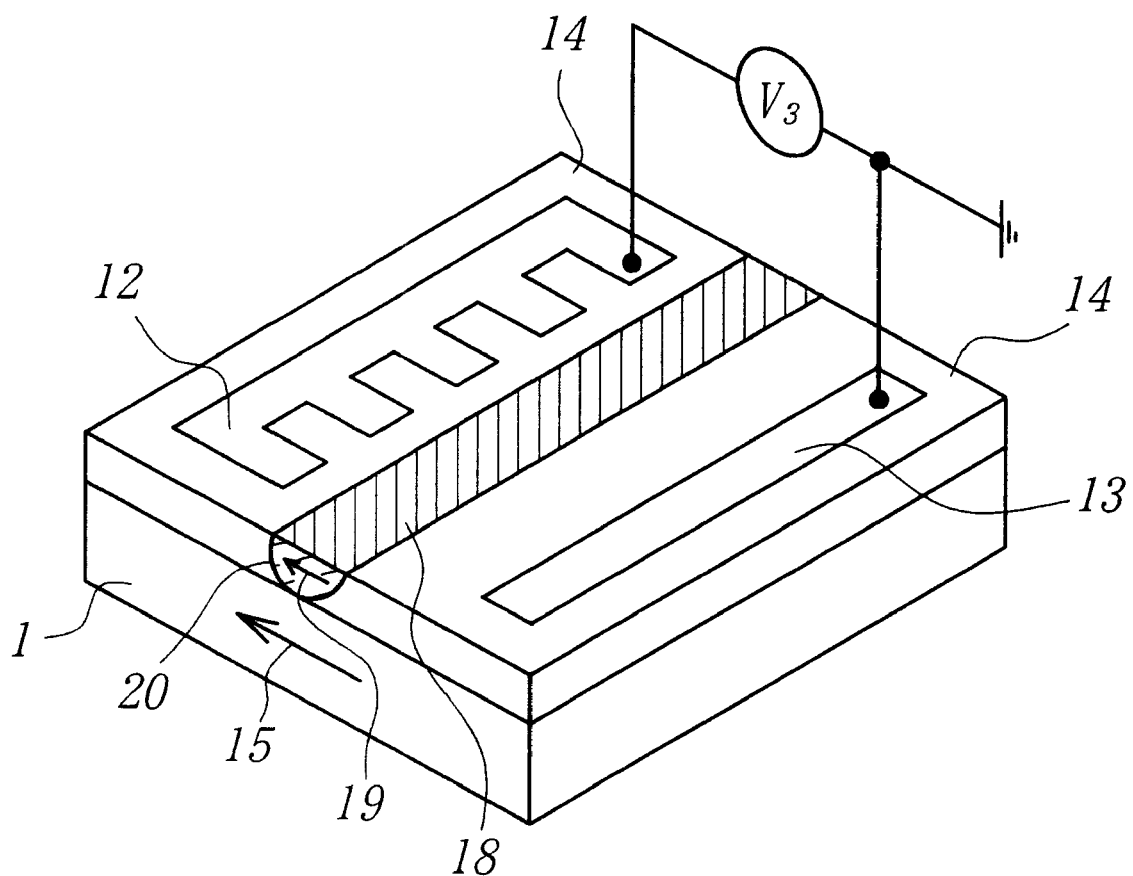
FIG. 4 is a view for explaining another example of a method for forming a ferroelectric domain-inverted structure of the present invention.

A method for producing an optical waveguide element according to the present invention does not always require that the ferroelectric single crystalline film 11 is formed in layered form as shown in FIG. 2. As shown in FIG. 4, a part of the ferroelectric single crystalline substrate 1 may be proton-exchanged and selectively etched so as to cross itself over the orientation of the polarization 15 in the substrate 1 and thereby a substrate-concave portion 20 is formed. Then, a ferroelectric single crystalline film 18 may be formed in the substrate-concave portion 20.

The angle of its crossing-over is preferably within a range of 45 degrees to 90 degrees. The width and the depth of the substrate-concave portion 20 are preferably 1 µm to 20 µm and 1 µm to 10 µm, respectively. The value and the build-up time of an electric voltage $V_3$ to be supplied at the above conditions are preferably 1 kV/mm to 1000 kV/mm and not more than 0.1 msec, respectively.

Figure 5:
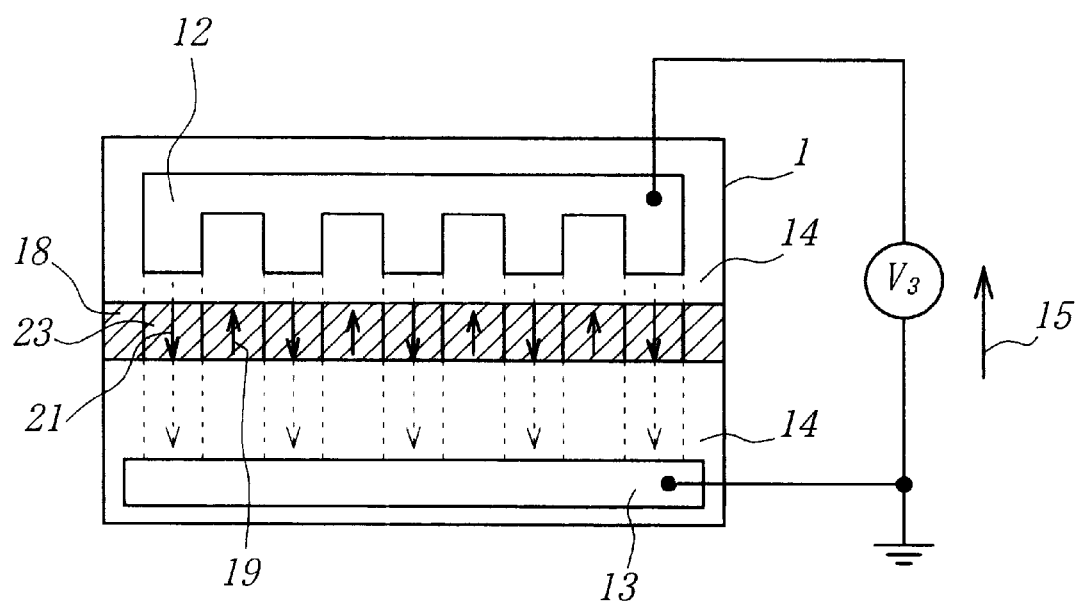
FIG. 5 is a view for explaining a polarization-condition by utilizing a method for forming a ferroelectric domain-inverted structure as shown in FIG. 4.

The electric voltage $V_3$ is supplied between the comb-shaped electrode 12 and the uniform electrode 13, which are formed so as to sandwich the substrate-concave portion 20 as shown in FIG. 4, and thereby ferroelectric domain-inverted parts 23 (see FIG. 5) each of which has opposite polarization 21 to the polarization 15 of the ferroelectric single crystalline substrate 1, are formed in the ferroelectric single crystalline film 18, depending on the pitch of the comb-shaped electrode 12 as shown in FIG. 5.

Although in FIG. 4, both of the comb-shaped electrode 12 and the uniform electrode 13 which compose a pair of electrodes are formed on the main surface 14 of the ferroelectric single crystalline substrate 1, the uniform electrode 13 which is grounded may be formed on the ferroelectric single crystalline film 18. Hereupon, for forming the clear ferroelectric domain-inverted parts 23 in the interior of the ferroelectric single crystalline film 18, as shown in FIG. 4, both of the electrodes 12 and 13 are preferably formed on the main surface 14 of the substrate 1.

Figure 6:
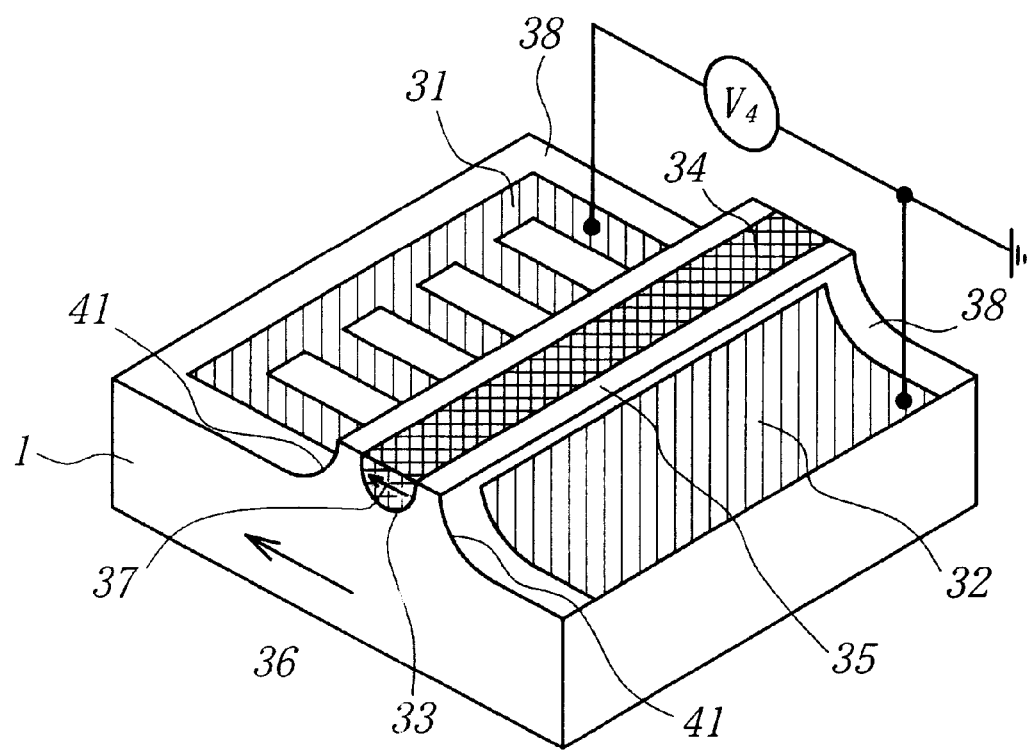
FIG. 6 is a view for explaining a further example of a method for forming a ferroelectric domain-inverted structure of the present invention.
Figure 7:
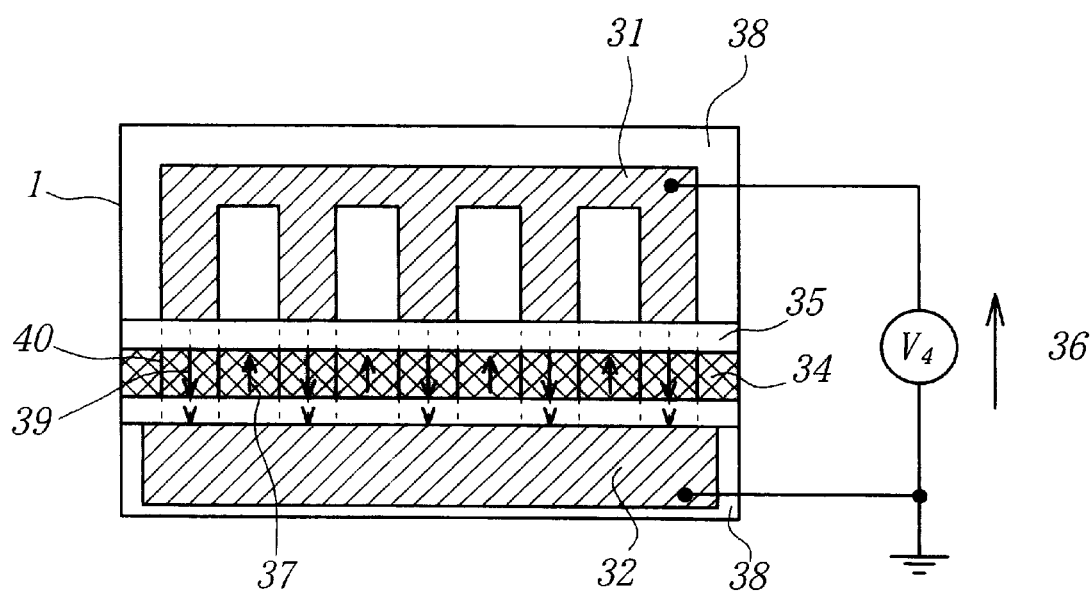
FIG. 7 is a view for explaining a polarization-condition by utilizing a method for forming a ferroelectric domain-inverted structure as shown in FIG. 6.

For increasing the depth of the ferroelectric domain-inverted parts, it is preferable that, as shown in FIG. 6, formed in a convex ridge portion 35, which is made on the ferroelectric single crystalline substrate 1, is a substrate-concave portion 33, in which a ferroelectric single crystalline film 34 is formed and thereby the film 34 is preferably ferroelectric domain-inverted.

The convex ridge portion 35 in FIG. 6 is formed by proton-exchanging and selectively etching the remnant portion thereof except the portion 35.

Although both of a comb-shaped electrode 31 and a uniform electrode 32 are formed on a main surface 38 of the ferroelectric single crystalline substrate 1 in FIG. 6, the uniform electrode 32 which is grounded may be formed on the ferroelectric single crystalline film 34 as above mentioned.

Moreover, although both of the comb-shaped electrode 31 and the uniform electrode 32 are formed so that they may contact with side faces 41 of the convex ridge portion 35 in FIG. 6, they may be formed only on the main surface 38 of the ferroelectric single crystalline substrate 1 without contacting with the side faces 41. For forming ferroelectric domain-inverted parts 40 each of which has a opposite polarization 39 to a polarization 36 of the ferroelectric single crystalline substrate 1, as shown in FIG. 6, both of the comb-shaped electrode 31 and the uniform electrode 32 are preferably formed on the main surface 38 so that they may be in contact with the side faces 41 of the convex ridge portion 35.

The value and the build-up time of an electric voltage $V_4$ are 1 kV/mm to 1000 kV/mm and not more than 0.01 msec, respectively.

Figure 8:
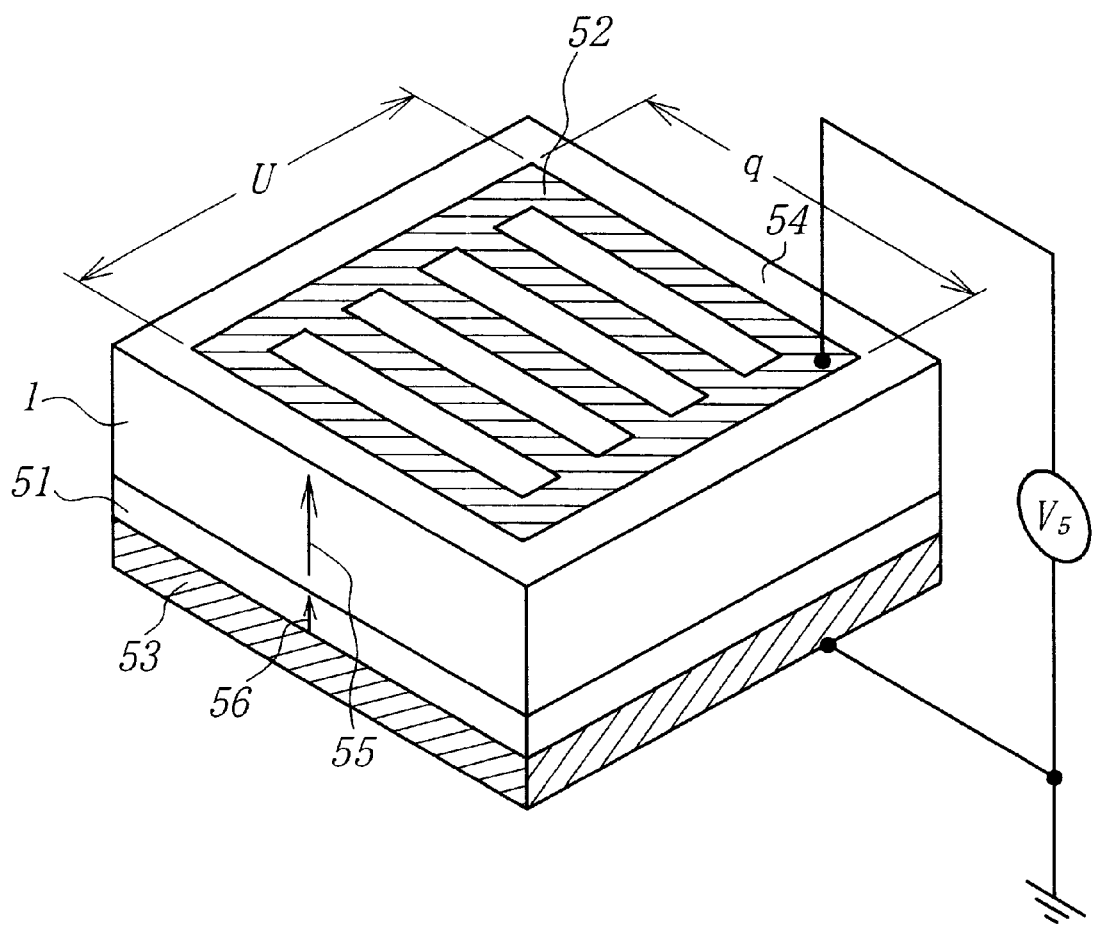
FIG. 8 is a view for explaining an example of an arranged electrode so as to sandwich ferroelectric single crystalline substrates in a method for forming a ferroelectric domain-inverted structure according to the present invention.

FIG. 8 is a view for explaining another embodiment in the method for forming a ferroelectric domain-inverted structure according to the present invention.

Regardless of whether the ferroelectric single crystalline film is formed on a main surface 54 of the ferroelectric single crystalline substrate 1, a comb-shaped electrode 52 is formed on the main surface 54 as shown in FIG. 8, whereby the object of the present invention can be attained.

In FIG. 8, the comb-shaped electrode 52 and a uniform electrode 53 are arranged in opposite position so that they may sandwich the ferroelectric single crystalline substrate I and a ferroelectric single crystalline film 51.

In FIG. 8, as a ferroelectric material usable for the ferroelectric single crystalline substrate 1, the same material as in FIG. 6 may be employed. Then, the main surface of the substrate may be also composed of every kind of crystalline face such as an X-cut face, a Y-cut face, or a Z-cut face. In the case of arranging the electrodes in opposite position as shown in FIG. 8, however, the cut face is preferably selected so that a polarization-axis may coincide with an opposed direction of the electrodes.

The ferroelectric single crystalline film 51 may be formed in the same manner as in FIG. 6, and the same material as in FIG. 6 can be used as the film 51.

The comb-shaped electrode 52 and the uniform electrode 53 are formed in the above manner, after the ferroelectric single crystalline film 51 is formed on the ferroelectric single crystalline substrate 1 by the liquid phase epitaxial method, polarizations 55 of the substrate 1 are transcribed to the film 51 to form polarizations 56 therein.

The thickness of the ferroelectric single crystalline film 51 is, for utilizing it as an optical waveguide, preferably 1 μm to 30 μm.

Figure 9:
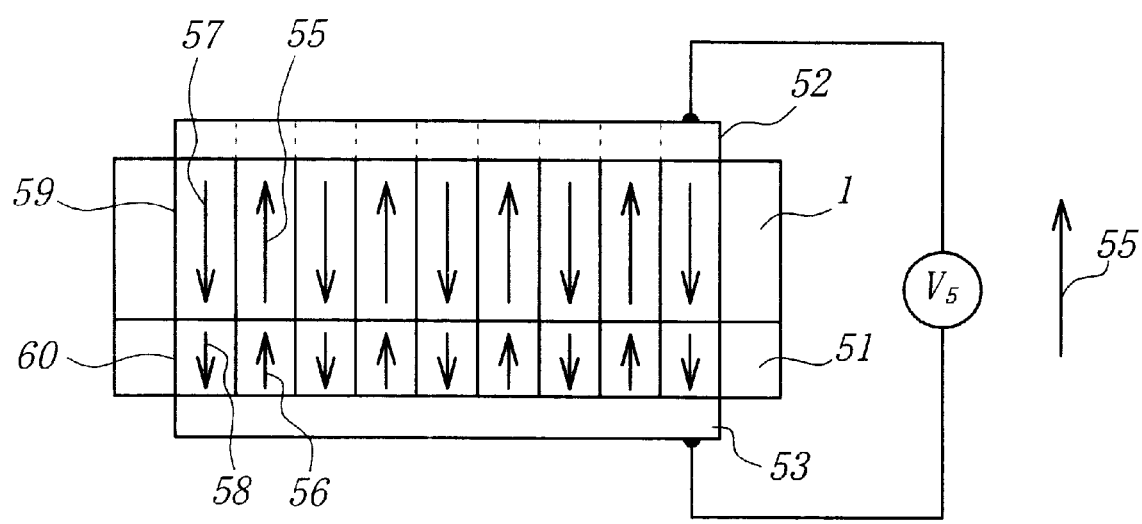
FIG. 9 is a view for explaining a polarization-condition by utilizing a method for forming a ferroelectric domain-inverted structure as shown in FIG. 8.

By supplying an electric voltage $V_5$ between the comb-shaped electrode 52 and the uniform electrode 53 as shown in FIG. 8, opposite polarizations 57 and 58 to the polarizations 55 of the substrate 1 are formed in the substrate 1 and the film 51, respectively, as shown in FIG. 9, depending on the pitch of the comb-shaped electrode 52, whereby ferroelectric domain-inverted parts 59 and 60 are formed therein.

The value and the build-up time of the electric voltage $V_5$ are preferably 1 kV/mm to 1000 kV/mm and not more than 0.01 msec, respectively.

In the case of employing lithium niobate-lithium tantalate single crystal, as the ferroelectric single crystalline film 51, having clear ferroelectric domain-inversion characteristics or conditions, the build-up time is preferably 0.01 msec to 10 msec.

Moreover, in the case of using lithium niobate-lithium tantalate single crystal as the film 51 and forming the comb-shaped electrode 52 to start ferroelectric domain-inversion on the film 51, exchanging the comb-shaped electrode 52 for the uniform electrode 53, the electric voltage's build-up time of not more than 0.01 msec to enable the ferroelectric domain-inverted structure to be formed in the film 51.

FIG. 8 depicts only a one-layered ferroelectric single crystalline film, but even though ferroelectric single crystalline films having different compositions are formed in two or more-layers, the ferroelectric domain-inverted structure can be formed in each of the films, by forming the electrodes as shown in FIG. 8 and ferroelectric domain-inverting the films with an electric voltage $V_6$ of the same value and build-up time as in the electric voltage $V_5$ of FIG. 8.

EXAMPLES

The invention will be explained in more detail with reference to the following examples.

Example 1

In this example, as the ferroelectric single crystalline substrate 1, a substrate having an X-cut face, made of poled lithium niobate single crystal containing 5 mol % Mg, was used.

Next, a linear mask pattern of tantalum having an opening width of about 1 μm was formed on the substrate 1 by photolithography. The substrate 1 having the mask pattern was dipped in benzoic acid and proton-exchanged. Thereafter, the mask pattern and the proton-exchanged part were removed with a mixed solution of hydrofluoric acid and nitric acid and thereby the substrate-concave portion 20 having a cross sectional shape that is almost semicircular was formed in a width of about 4 μm and a depth of about 2 μm, as shown in FIG. 4.

Then, a film made of lithium niobate single crystal containing 5 mol % Zn was formed by the liquid phase epitaxial method. The parts of the film except in the substrate-concave portion 20 were removed by grinding, and thereby the ferroelectric single crystalline film 18 was formed in the substrate-concave portion 20 as shown in FIG. 4.

Next, the comb-shaped electrode 12 and the uniform electrode 13 made of tantalum were formed, in a thickness of 60 nm, on both sides of the substrate-concave portion 20 of the substrate 1. Moreover, the comb-shaped electrode 12 was formed in the convex portion's width W of 1.5 μm, a convex portion's depth D of 50 μm, the pitch L of 3.4 μm, and a length U of 10 mm. The uniform electrode 13 was formed in a width S of 30 μm and a length of 10 mm.

The distance E between the comb-shaped electrode 12 and the uniform electrode 13 was 100 μm, and the distance F between the top of each convex portion in the electrode 12 and the ferroelectric single crystalline film 18 was 5 μm.

When an electric voltage of 20 kV/mm was supplied between the above electrodes 12 and 13 at a build-up time of 0.5 msec, ferroelectric domain-inversion was observed in the ferroelectric single crystalline film 18. Thus, according to this example, the ferroelectric domain-inverted structure can be formed in good condition.

Comparative Example 1

Figure 1:
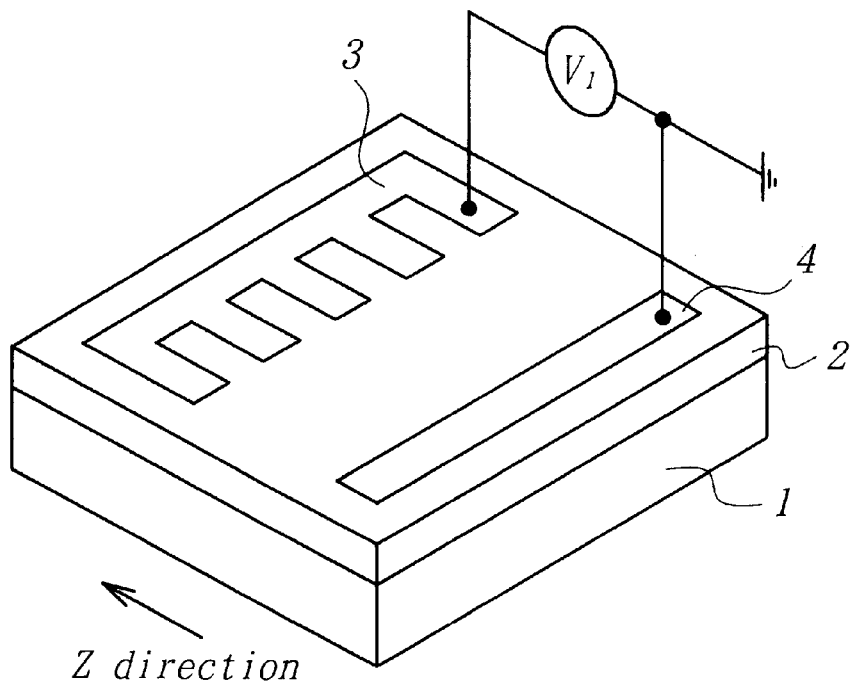
FIG. 1 is a view for explaining a problem to be solved by the present invention.

The ferroelectric single crystalline film 2 as shown in FIG. 1 was formed on the ferroelectric single crystalline substrate 1 in the same manner as in Example 1.

Next, the same comb-shaped electrode 3 and uniform electrode 4 as those in Example 1 were formed on the film 2.

When an electric voltage of 20 kV/mm was supplied between the electrodes 3 and 4 at a build-up time of 0.5 msec, ferroelectric domain-inversion was not observed in the ferroelectric single crystalline film 2.

Example 2

As the ferroelectric single crystalline substrate, a substrate having a −Z-cut face, made of poled lithium niobate, was used. In the same manner as in Example 1, the ferroelectric single crystalline film 53 as shown in FIG. 8 was formed in a thickness of 20 μm by the liquid phase epitaxial method, and thereafter the comb-shaped electrode 52 and the uniform electrode 53 were formed to sandwich the ferroelectric single crystalline substrate 1 and the ferroelectric single crystalline film 51.

When an electric voltage of 20 kV/mm was supplied between the electrodes 52 and 53 at a build-up time of 0.5 msec, ferroelectric domain-inversion was observed in the substrate 1 and the film 51. Thus, according to this example, the ferroelectric domain-inverted structures can be formed in good condition.

Example 3

As the ferroelectric single crystalline substrate 1, a substrate having a +Z-cut face, made of poled lithium niobate, was employed and the ferroelectric single crystalline film 51 was formed on the +Z-cut face of the substrate. Except for the comb-shaped electrode 52 being formed on the film 51, the uniform electrode 53 being formed on the substrate 1, and an electric voltage's build-up time being 0.005 msec, different from Example 2, this example was carried out in the same manner as in Example 2, based on the structure as shown in FIG. 8.

Ferroelectric domain-inversion was observed in the substrate 1 and the film 51, so that, according to this example, the ferroelectric domain-inverted structure can be formed in good condition.

Comparative Example 2

Except of a build-up time being 0.5 msec, this example was carried out in the same manner as in Example 3. In this example, ferroelectric domain-inversion was not observed in the substrate 1 and the film 51.

Example 4

Figure 10:
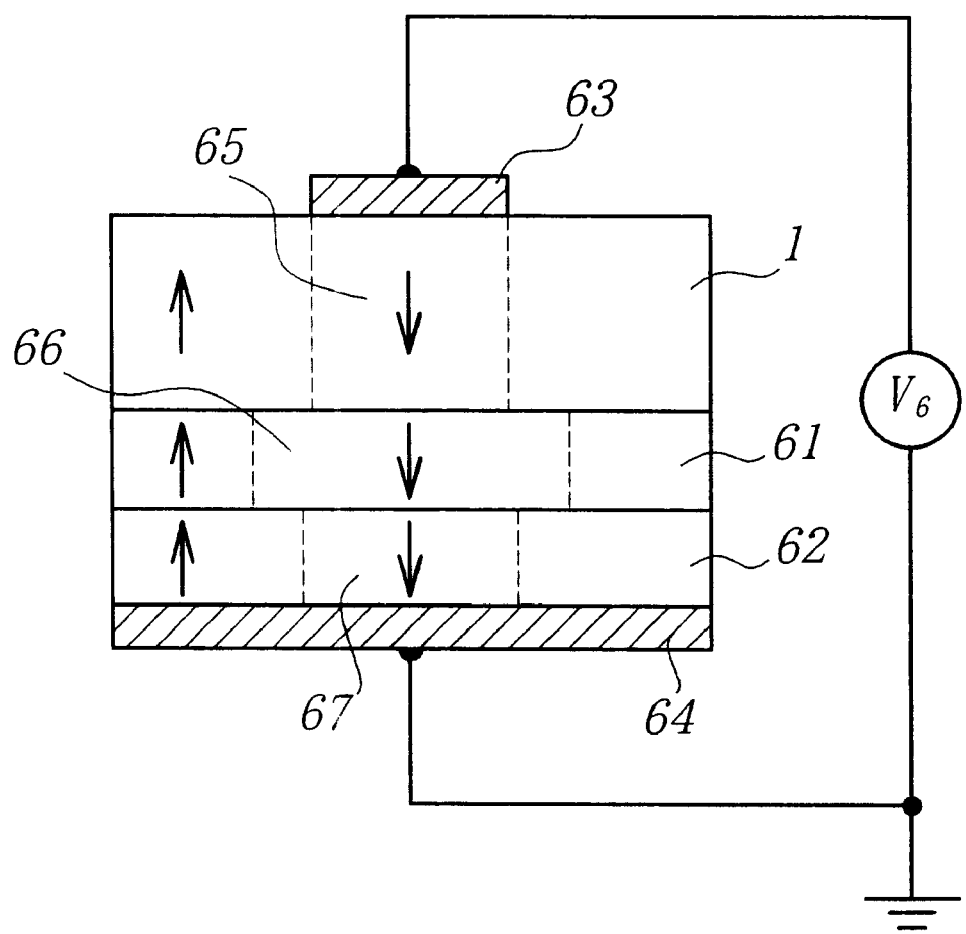
FIG. 10 is a view for explaining another example of an arranged electrode so as to sandwich a ferroelectric single crystalline substrate in a method for forming a ferroelectric domain-inverted structure according to the present invention.

As shown in FIG. 10, a film 61 made of $LiNb_{0.4}Ta_{0.6}O_3$ and a film 62 made of $LiNb_{0.9}Ta_{0.1}O_3$ were formed on the −Z-cut face of the ferroelectric single crystalline substrate 1 by the liquid phase epitaxial method, and an electrode 63 having a cross sectional area A was formed on the +Z-cut face of the substrate, and a uniform electrode 64 was formed on the −Z-cut face of the film 62.

When an electric voltage of 20 kV/mm was supplied between the electrodes at a build-up time of 0.5 msec, the ferroelectric domain-inversion from the electrode 63 in the substrate 1 progressed beyond the boundary of the films 61 and 62 and the ferroelectric domain-inverted structure was formed in the film 62 made of $LiNb_{0.9}Ta_{0.1}O_3$.

The cross sectional area of each of ferroelectric domain-inverted parts 65 in the ferroelectric domain-inverted structure of the lithium niobate single crystalline substrate 1 almost equaled the cross sectional area A of the electrode 63, and the cross sectional area of each of ferroelectric domain-inverted parts 66 was about 1.22 times as large as the cross sectional area A of the electrode 63. Moreover, the cross sectional area of each of the ferroelectric domain-inverted parts 67 in the film made of $LiNb_{0.9}Ta_{0.1}O_3$ was about 1.03 Å.

As above mentioned, according to the method for forming a ferroelectric domain-inverted structure of the present invention, a fine ferroelectric domain-inverted structure can be formed easily in a material typically resisting ferroelectric domain-inversion. By joining a ferroelectric single crystal having unknown ferroelectric domain-inversion characteristics or conditions to a ferroelectric single crystal having known ferroelectric domain-inversion characteristics or conditions, and starting the ferroelectric domain-inversion from the known ferroelectric single crystal, a ferroelectric domain-inversion structure can be formed in the unknown ferroelectric single crystal.

Moreover, by joining a ferroelectric single crystal having a characteristic for a ferroelectric domain-inverted part to shrink or enlarge and ferroelectric domain-inverting another ferroelectric single crystal joined thereto, the ferroelectric domain-inverted structure having a different inversion-area or inversion-shape can be formed in the shrinking or enlarging ferroelectric single crystalline substrate.

What is claimed is:

1. A method for forming a ferroelectric domain-inverted structure, comprising the steps of:

forming at least one ferroelectric material having an unknown spontaneous polarization on a ferroelectric substrate having a known spontaneous polarization; and ferroelectric domain-inverting regions of said ferroelectric substrate and thereby ferroelectric domain-inverting corresponding regions of said ferroelectric material.

2. A method for forming a ferroelectric domain-inverted structure as defined in claim 1, wherein the area of each of the ferroelectric domain-inverted regions formed in said ferroelectric substrate is different from that of each of the corresponding ferroelectric domain-inverted regions formed in said ferroelectric material.

3. A method for forming a ferroelectric domain-inverted structure as defined in claim 2, wherein the shortest length of the surface shape in each of the ferroelectric domain-inverted regions of said ferroelectric material is not more than 1 mm.

4. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 3.

5. An optical waveguide element, comprising a substrate made of ferroelectric crystalline material and a film made of ferroelectric crystalline material, said film having a ferroelectric domain-inverted structure formed according to the method of claim 3.

6. A method for forming a ferroelectric domain-inverted structure as defined in claim 2, wherein at least one of said ferroelectric substrate and said ferroelectric material is composed of a ferroelectric single crystal.

7. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 6.

8. An optical waveguide element, comprising a substrate made of ferroelectric crystalline material and a film made of ferroelectric crystalline material, said film having a ferroelectric domain-inverted structure formed according to the method of claim 6.

9. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 2.

10. An optical waveguide element, comprising a substrate made of ferroelectric crystalline material and a film made of ferroelectric crystalline material, said film having a ferroelectric domain-inverted structure formed according to the method of claim 2.

11. A method for forming a ferroelectric domain-inverted structure as defined in claim 1, wherein the shortest length of the surface shape in each of the ferroelectric domain-inverted regions of said ferroelectric material is not more than 1 $\mu$m.

12. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 11.

13. An optical waveguide element, comprising a substrate made of ferroelectric crystalline material and a film made of ferroelectric crystalline material, said film having a ferroelectric domain-inverted structure formed according to the method of claim 11.

14. A method for forming a ferroelectric domain-inverted structure as defined in claim 1, wherein at least one of said ferroelectric substrate and said ferroelectric material is composed of a ferroelectric single crystal.

15. A method for producing an optical waveguide element, comprising the steps of:

preparing a substrate made of ferroelectric crystalline material, forming a film made of ferroelectric crystalline material, forming a ferroelectric domain-inverted structure in the film according to the method of claim 14.

16. An optical waveguide element, comprising a substrate made of ferroelectric crystalline material and a film made of ferroelectric crystalline material, said film having a ferroelectric domain-inverted structure formed according to the method of claim 14.

17. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 1.

18. An optical waveguide element, comprising a substrate made of ferroelectric crystalline material and a film made of ferroelectric crystalline material, said film having a ferroelectric domain-inverted structure formed according to the method of claim 1.

19. A method for forming a ferroelectric domain-inverted structure, comprising the steps of:

forming a film made of ferroelectric single crystal on a main surface of a substrate made of ferroelectric single crystal by a liquid phase epitaxial method;

forming a pair of electrodes on said substrate, one of said electrodes being formed on said main surface of said substrate;

supplying a predetermined voltage between said electrodes to form ferroelectric domain-inverted regions in said substrate; and progressing ferroelectric domain-inversion beyond the boundary between said substrate and said film from said main surface of said substrate, and thereby forming corresponding ferroelectric domain-inverted regions in said film.

20. A method for forming a ferroelectric domain-inverted structure as defined in claim 19, wherein said substrate is polarized substantially parallel to said main surface thereof and said film is formed in a concave portion made in said substrate, said film being made of a ferroelectric material having a larger refractive index than that of said substrate.

21. A method for forming a ferroelectric domain-inverted structure as defined in claim 20, wherein said substrate is made of a single crystalline material having a composition of $LiNb_{1-x}Ta_xO_3$ ($0 \leq x \leq 1$), and also contains an element for developing optical damage resistance.

22. A method for forming a ferroelectric domain-inverted structure as defined in claim 21, wherein the element for developing optical damage resistance is at least one element selected from the group consisting of magnesium, scandium, and zinc.

23. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 22.

24. An optical waveguide element, comprising a substrate made of ferroelectric crystalline material and a film made of ferroelectric crystalline material, said film having a ferroelectric domain-inverted structure formed according to the method of claim 22.

25. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 21.

26. An optical waveguide element, comprising a substrate made of ferroelectric crystalline material and a film made of ferroelectric crystalline material, said film having a ferroelectric domain-inverted structure formed according to the method of claim 21.

27. A method for forming a ferroelectric domain-inverted structure as defined in claim 20, wherein said film is made of a single crystalline material having a composition of $LiNb_{1-x}Ta_xO_3$ ($0 \leq x \leq 1$), optionally containing at least one element selected from the group consisting of titanium, magnesium, neodymium, erbium, and scandium.

28. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 27.

29. An optical waveguide element, comprising a substrate made of ferroelectric crystalline material and a film made of ferroelectric crystalline material, said film having a ferroelectric domain-inverted structure formed according to the method of claim 27.

30. A method for producing an optical waveguide element, comprising the steps of:

preparing a substrate made of ferroelectric crystalline material, forming a film made of ferroelectric crystalline material on the substrate, and forming a ferroelectric domain-inverted structure in the film according to the method of claim 20.

31. An optical waveguide element, comprising a substrate made of ferroelectric crystalline material and a film made of ferroelectric crystalline material, said film having a ferroelectric domain-inverted structure formed according to the method of claim 20.

32. A method for forming a ferroelectric domain-inverted structure as defined in claim 20, wherein the concave portion is formed on a ridge-type portion made on said substrate.

33. A method for forming a ferroelectric domain-inverted structure as defined in claim 32, wherein said substrate is made of a single crystalline material having a composition of $LiNb_{1-x}Ta_xO_3(0 \leqq x \leqq 1)$, and also contains an element for developing optical damage resistance.

34. A method for forming a ferroelectric domain-inverted structure as defined in claim 33, wherein the element for developing optical damage resistance is at least one element selected from the group consisting of magnesium, scandium, and zinc.

35. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 34.

36. An optical waveguide element, comprising a substrate made of ferroelectric crystalline material and a film made of ferroelectric crystalline material, said film having a ferroelectric domain-inverted structure formed according to the method of claim 34.

37. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 33.

38. An optical waveguide element, comprising a substrate made of ferroelectric crystalline material and a film made of ferroelectric crystalline material, said film having a ferroelectric domain-inverted structure formed according to the method of claim 33.

39. A method for forming a ferroelectric domain-inverted structure as defined in claim 32, wherein said film is made of a single crystalline material having a composition of $LiNb_{1-x}Ta_xO_3(0 \leqq x \leqq 1)$, optionally containing at least one element selected from the group consisting of titanium, magnesium, neodymium, erbium, and scandium.

40. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 39.

41. An optical waveguide element, comprising a substrate made of ferroelectric crystalline material and a film made of ferroelectric crystalline material, said film having a ferroelectric domain-inverted structure formed according to the method of claim 39.

42. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 32.

43. An optical waveguide element, comprising a substrate made of ferroelectric crystalline material and a film made of ferroelectric crystalline material, said film having a ferroelectric domain-inverted structure formed according to the method of claim 32.

44. A method for forming a ferroelectric domain-inverted structure as defined in claim 19, wherein said substrate is made of a single crystalline material having a composition of $LiNb_{1-x}Ta_xO_3(0 \leqq x \leqq 1)$, and also contains an element for developing optical damage resistance.

45. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 44.

46. An optical waveguide element, comprising a substrate made of ferroelectric crystalline material and a film made of ferroelectric crystalline material, said film having a ferroelectric domain-inverted structure formed according to the method of claim 44.

47. A method for forming a ferroelectric domain-inverted structure as defined in claim 44 wherein the element for developing optical damage resistance is at least one element selected from the group consisting of magnesium, scandium, and zinc.

48. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 47.

49. An optical waveguide element, comprising a substrate made of ferroelectric crystalline material and a film made of ferroelectric crystalline material, said film having a ferroelectric domain-inverted structure formed according to the method of claim 47.

50. A method for forming a ferroelectric domain-inverted structure as defined in claim 19, wherein said film is made of a single crystalline material having a composition of $LiNb_{1-x}Ta_xO_3(0 \leqq x \leqq 1)$, optionally containing at least one element selected from the group consisting of titanium, magnesium, neodymium, erbium, and scandium.

51. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 50.

52. An optical waveguide element, comprising a substrate made of ferroelectric crystalline material and a film made of ferroelectric crystalline material, said film having a ferroelectric domain-inverted structure formed according to the method of claim 50.

53. A method for producing an optical waveguide element, comprising the steps of:
  preparing a substrate made of ferroelectric crystalline material,
  forming a film made of ferroelectric crystalline material on the substrate, and
  forming a ferroelectric domain-inverted structure in the film according to the method of claim 19.

54. An optical waveguide element, comprising a substrate made of ferroelectric crystalline material and a film made of ferroelectric crystalline material, said film having a ferroelectric domain-inverted structure formed according to the method of claim 19.

55. A method for forming a ferroelectric domain-inverted structure comprising the steps of:

preparing a substrate made of a ferroelectric single crystalline material;

forming, on the substrate, a film made of a ferroelectric single crystalline material having a composition of $LiNb_{1-x}Ta_xO_3 (0 \leqq x \leqq 1)$ by a liquid phase epitaxial method;

forming, on the ferroelectric single crystalline substrate, a pair of electrodes so as to sandwich at least the boundary between the ferroelectric single crystalline film and the ferroelectric single crystalline substrate;

supplying a predetermined electric voltage between the electrodes at a build-up time of not more than 0.01 msec to generate ferroelectric domain-inverted regions in the ferroelectric single crystalline substrate; and progressing the ferroelectric domain inversion from the ferroelectric domain-inverted regions beyond the boundary between the ferroelectric single crystalline film and the ferroelectric single crystalline substrate to form a ferroelectric domain-inverted structure in the ferroelectric single crystalline film.

56. A method for forming a ferroelectric domain-inverted structure comprising the steps of:

preparing a substrate made of a ferroelectric single crystalline material;

forming, on the substrate, a film made of a ferroelectric single crystalline material having a composition of $LiNb_{1-x}Ta_xO_3 (0 \leqq x \leqq 1)$ by a liquid phase epitaxial method;

forming, on the ferroelectric single crystalline substrate, a pair of electrodes so as to sandwich at least the boundary between the ferroelectric single crystalline film and the ferroelectric single crystalline substrate;

supplying a given electric voltage between the electrodes at a build-up time of not more than 0.01–10 msec to generate ferroelectric domain-inverted regions in the ferroelectric single crystalline substrate; and progressing the ferroelectric domain inversion from the ferroelectric domain-inverted regions beyond the boundary between the ferroelectric single crystalline film and the ferroelectric single crystalline substrate to form a ferroelectric domain-inverted structure in the ferroelectric single crystalline film.

* * * * *